United States Patent [19]

Morino et al.

[11] 4,025,263

[45] May 24, 1977

[54] THERMOPLASTIC DUPLICATION PLATE MANUFACTURING APPARATUS

[75] Inventors: Ikuo Morino, Toyonaka; Nobuo Aisu, Osaka, both of Japan

[73] Assignee: Nippon Paint Co., Ltd., Osaka, Japan

[22] Filed: June 23, 1976

[21] Appl. No.: 699,050

[30] Foreign Application Priority Data

Sept. 5, 1975 Japan ............................ 50-108171

[52] U.S. Cl. ................................ 425/168; 425/315; 425/317; 425/363; 425/385; 425/DIG. 201

[51] Int. Cl.$^2$ ...................... B29C 3/06; B29C 15/00

[58] Field of Search .......... 425/150, 168, 385, 384, 425/383, 388, 315, 289, 363, 364 R, 317, 324 R, DIG. 200, DIG. 201, 455

[56] References Cited

UNITED STATES PATENTS

| | | | |
|---|---|---|---|
| 2,849,752 | 9/1958 | Leary | 425/385 X |
| 3,131,425 | 5/1964 | Jacobs et al. | 425/385 X |
| 3,157,723 | 11/1964 | Hochberg | 425/385 X |
| 3,412,427 | 11/1968 | Fliesfeder et al. | 425/DIG. 201 |
| 3,596,322 | 8/1971 | Swezey | 425/DIG. 200 |

*Primary Examiner*—Robert L. Spicer, Jr.
*Attorney, Agent, or Firm*—Wenderoth, Lind & Ponack

[57] ABSTRACT

An apparatus for manufacturing thermoplastic duplication plates having a relief image transcribed thereto from a matrix which has a relief pattern in complemental relation to the transcribed relief image. To this end, the apparatus includes a hollow cylinder heated to a predetermined temperature and by which a thermoplastic resin sheet is, while clinging thereto, transported towards a transcription clearance. A movable platen supported for movement between standby and operated positions cooperates with the hollow cylinder to define the transcription clearance. During the transportation of the thermoplastic resin sheet towards the transcription clearance, it becomes substantially semi-fluidized so that, during passage of the thermoplastic resin sheet together with the matrix carried by the platen being moved towards the operated position, the thermoplastic resin sheet penetrates deep into indentations in the matrix which define the relief pattern, thereby completing a thermoplastic duplication plate.

13 Claims, 9 Drawing Figures

THERMOPLASTIC DUPLICATION PLATE MANUFACTURING APPARATUS

The present invention generally relates to the art of production of thermoplastic duplication plates and, more particularly, to an apparatus for manufacturing thermoplastic duplication plates each having a relief pattern in complemental relation to the transcribed relief image on the thermoplastic duplication plate.

The thermoplastic duplication plate manufacturing apparatus to which the present invention also pertains is well known and disclosed, for example, in the Japanese Pat. Publication (Examined) No. 12933 published for opposition on Apr. 24, 1973. According to the Japanese Pat. Publication as numbered above, the apparatus is shown to comprise means for successively supplying thermoplastic resin sheets, prepared from polyethylene or polypropylene resin, one at a time through a heating furnace and a pair of press and back-up rolls juxtaposed to each other with a transcription clearance defined therebetween. The sheet supplying means in the apparatus now under discussion includes a substantially endless metallic conveyor belt, having an upper run thereof extending through the heating furnace and then through the transcription clearance, and a substantially endless releasing paper medium being driven externally of the endless metallic conveyor belt and having an upper run thereof extending through the heating furnace and then through the transcription clearance in substantial contact with the upper run of the metallic conveyor belt. While each of the press and back-up rolls is of water-cooled construction, the apparatus further comprises a cooling roll of water-colled construction positioned laterally of the press roll at the leading side with respect to the direction of movement of the upper run of the metallic conveyor belt, a leading end portion of the upper run of the releasing paper medium being curved in a direction diverging from the upper run of the metallic conveyor belt and then deflected around the cooling roll.

With the apparatus so constructed, the thermoplastic resin sheet is, during passage thereon through the heating furnace while carried by the upper run of the metallic conveyor belt with the upper run of the releasing paper medium interposed between said thermoplastic resin sheet and said upper run of said conveyor belt, allowed to substantially melt or become pliable to an extent that the thermoplastic resin constituting the thermoplastic resin sheet can penetrate during the subsequent transcription process into indentations or cavites which define the relief pattern on a paper matrix. The thermoplastic resin sheet is then passed through the transcription clearance between the press and back-up rools, the press roll having the paper matrix fixedly mounted on the outer peripheral surface thereof. Transcription of the relief pattern on the paper matrix to the thermoplastic resin sheet so substantially semi-fluidized during the passage through the heating furnace takes place during the passage of the thermoplastic resin sheet through the transcription clearance.

In this apparatus under discussion, since the leading end portion of the releasing paper medium used for avoiding sticking of the thermoplastic resin sheet to the conveyor belt is deflected around the press roll in a direction diverging from the upper run of the conveyor belt and further deflected around the cooling roll in a direction departing from the press roll, the thermoplastic resin sheet is, subsequent to transcription, moved along a curved path defined between the press roll and a portion of the releasing paper medium between the first and second mentioned deflection points.

The apparatus of the Japanese Pat. Publication as numbered above is satisfactory in the manufacture of the thermoplastic duplication plates for use as printing plates utilizable in printing newspapers or the like printed materials of a nature being issued in a large number and required to be available to readers or those interested. However, the following disadvantages have been found:

1. Since the paper matrix is curved, as attached to the outer peripheral surface of the press roll, during the transcription of the relief pattern on the paper matrix to the thermoplastic resin sheet in the substantially semifluidized state, reproduction of the details is insufficient and the resultant duplication plate is also so curved that the subsequent processing, such as trimming for removing unnecessary fins present at peripheral edges of the duplication plate, is complicated.

2. Since the paper matrix, the thermoplastic resin sheet, the releasing paper medium and the metallic conveyor belt are all simultaneously moved through the transcription clearance between the press and back-up rolls during the transcription process, not only does the transcription be hardly achieved precisely, but also there is the possibility of variation in thickness of the thermoplastic duplication plate.

3. Since the metallic conveyor belt is repeatedly heated and cooled during the passage through the heating furnace and in contact with the water-cooled back-up roll, respectively, not only does the conveyor as a whole be complicated and bulky in size, but also the conveyor belt is susceptible to reduction in durability.

4. Partly because the resultant thermoplastic duplication plate is curved as hereinbefore described, and partly because of the presence of the releasing paper medium, both automatic transportation of the resultant thermoplastic duplication plate towards the subsequent processing station, for example, a trimming station, and automatic positioning of the thermoplastic duplication plate at the trimming station with respect to a cutting or trimming machine are impossible and, if not impossible, can hardly be achieved without difficulties in design and construction. This means that the manufacture of the thermoplastic duplication plates readily available, without being subjected to any other processing step, as a printing plate for use in a high speed rotary press, cannot be automated.

5. Because of the concurrent employment of the relasing paper medium and the metallic conveyor belt both in the substantially endless form, synchronized drive of both the releasing paper medium and the conveyor belt can hardly be achieved with respect to each other and also with respect to one or both of the press and back-up rolls which also require synchronization. In other words, the velocity of transportation of the thermoplastic resin sheet towards and past the transcription clearance by means of the conveyor can hardly be synchronized with the velocity of angular movement of the paper matrix on the outer peripheral surface of the press roll being rotated.

6. If the releasing paper medium is otherwise not employed as it is an obvious expedient by those skilled in the art, frictional displacement tends to occur between the thermoplastic resin sheet and the paper matrix during the passage through the transcription clearance, resulting in incorrect transcription of the relief pattern on the paper matrix to the thermoplastic resin sheet.

7. Because of the employment of the releasing paper medium which requires frequent replacement, though it is not the only reason, the manufacturing cost of the resultant thermoplastic duplication plate is high.

In view of the above described disadvantages inherent in the conventional duplication plate making apparatus, the inventors have successfully made every effort to develope a similar apparatus which substantially eliminates the above described disadvantages and which does not require the transportation of the paper matrix in a curved condition and wherein the matrix is, however, reciprocally moved in a linear direction in the form of a plate-like shape without being curved or deformed even during the passage thereof through the transcription clearance.

More specifically, the apparatus successfully developed by the inventors for the purpose of the present invention comprises a temperature adjustable press roll for transporting the thermoplastic resin sheet towards a transfer station where the transcription clearance is defined and where the thermoplastic resin sheet is pressed to and transferred onto the matrix with the relief pattern on the paper matrix transcribed to the thermoplastic resin sheet. This is possible because the press roll and, more particularly, the outer peripheral surface of the press roll, is heated by a primary heating means to a temperature sufficient to allow the thermoplastic resin sheet to become so soft, or so substantially melted, as to cling to the outer peripheral surface of the press roll upon contact of the thermoplastic resin sheet with said outer peripheral surface of said press roll during rotation of the latter.

The primary heating means may comprises a source of hot air positioned externally of the press roll and an interior hollow of the press roll through which the hot air from the external hot air source is circulated to heat the press roll to a predetermined temperature, solely or in combination with an external heating unit positioned adjacent the outer peripheral surface of the press roll and extending substantially between a receiving station and the transfer station, the receiving station being where the thermoplastic resin sheet first contacts the outer peripheral surface of the press roll. Alternatively, the primary heating means may be constituted solely by the external heating unit.

In any event, during the transportation of the thermoplastic resin sheet from the receiving station towards the transfer station while said resin sheet clings to the outer peripheral surface of the press roll being rotated in one direction, the thermoplastic resin sheet is heated by heat energies from the press roll solely or in combination with heat energies emitted from the external heating unit, to a temperature sufficient to cause the thermoplastic resin sheet to substantially melt in readiness for the thermoplastic resin sheet to penetrate into indentations or cavities in the matrix during the subsequent transcription process, which indentations or cavities form the relief pattern on the matrix.

The duplication plate making apparatus according to the present invention further comprises a reciprocally linearly movable platen for the support of the matrix thereon, which movable platen is supported on a machine bench for reciprocal movement in a direction substantially tangential to the outer periphery of the press roll, but spaced a predetermined distance therefrom. The platen is of a box-like construction having a perforated flat support surface on which the paper matrix is steadily mounted by the effect of a suction force developed in the interior chamber of the platen and acting on the matrix through perforations in the flat support surface, the interior chamber of the platen being in communication with a source of vacuum.

The movable platen and the press roll are so synchronized that the thermoplastic resin sheet clinging to the outer peripheral surface of the press roll being rotated can be registered at the transfer station with the matrix on the reciprocally movable platen then being moved from a stand-by position towards an operated position, the transcription process being thereby performed. The platen is preferably water-cooled and, therefore, the thermoplastic resin sheet so transferred from the press roll onto the matrix on the platen is cooled within a reasonably short period of time in contact with said platen. Transfer of the thermoplastic resin sheet from the press roll onto the platen, while the outer peripheral surface of the press roll is substantially mirror-polished or otherwise smoothened or applied with a parting agent, is considered to take place by the effect of a difference in temperature between the press roll and the matrix. Therefore, the platen may not always have a water-cooled construction, but the water-cooled construction may be considered to facilitate the transfer of the thermoplastic resin sheet from the press roll onto the platen because of forced cooling of the matrix in contact with the platen and also to facilitate the resultant duplication plate prior to said duplication plate being separated from the matrix.

In order to ensure a substantially complete cooling of the thermoplastic resin sheet transferred onto the matrix on the platen which then approaches the operated position past the transfer station, the apparatus may include a source of cooling air to be applied to the thermoplastic resin sheet on the matrix.

In addition, for high speed production of the thermoplastic duplication plates with the apparatus of the present invention, the apparatus may include a preheating furnace through which any one of the thermplastic resin sheets is, by a conveyor, transported from a source of thermoplastic resin sheets accommodated therein in a stacked form towards the receiving station immediately above the press roll, the thermoplastic resin sheet during its passage through the preheating furnace being preheated to such a temperature as to enable the thermoplastic resin sheet to be readily softened in subsequent contact with the outer peripheral surface of the press roll. The employment of the preheating furnace, therefore, makes it possible to rotate the press roll at a higher speed than that where no preheating furnace is employed.

The conveyor extending through the preheating furnace may be constituted by either a substantially endless metallic belt or a belt of juxtaposed rolls. A chain conveyor or a conveyor having a substantially endless belt of metallic mesh may also be employed for the conveyor used in the present invention.

Where the duplication plate manufactured according to the present is used as a printing plate in, for example, a high speed rotary press, the apparatus of the present invention may further include a shaping unit for forming a pair of opposed lugs by bending the opposed peripheral margins of the resultant duplication plate subsequent to the trimming process, through which lugs the duplication plate can be fitted to a printing cylinder of the high speed rotary press as a printing plate.

In the apparatus so constructed, since the matrix is transported to the transfer station without being bent or curved on one hand and the plasticized thermoplastic resin sheet is pressed against the matrix while the thermoplastic resin sheet is curved as applied to the outer peripheral surface of the press roll on the other hand, the thermoplastic resin sheet can penetrate deep into the identations or cavities in the matrix at the transfer station as if a glue or caulking material were forced to fill gaps or voids up by the application of a spatula. The result is that the apparatus of the present invention makes it possible to provide a thermoplastic duplication plate capable of achieving reliable reproduction of print details. Moreover, the subsequent processing, such as trimming, can readily be performed subject to the duplication plate manufactured by the apparatus of the present invention and, therefore, the duplication plate satisfying the dimensional requirements within a tolerable range can readily be available.

Furthermore, since the duplication plate is made of the thermoplastic resin material, the duplication plate which has become unnecessary and, therefore, rejected, can be recycled for the production of another duplication plate, making a contribution to reduction of the manufacturing cost of the duplication plate.

Moreover, since the thermoplastic duplication plate assumes a flat plate-like shape at the time of completion of manufacture thereof, not only can the subsequent trimming process be readily achieved, but also exact positioning of the thermoplastic duplication plate with respect to the trimmer unit and also with respect to the shaping unit can readily be performed, because of handling easiness the thermoplastic duplication plate manufactured by the present invention provides.

In the apparatus of the present invention, the number of movable parts which must be synchronized in operation to each other is minimized. In other words, only the velocity of transportation of the matrix carried by the platen from the stand-by position towards the operated position is required to be synchronized with the peripheral velocity of the press roll. If the conveyor for transporting the thermoplastic resin sheets one at a time from the source of the thermoplastic resin sheets towards the receiving station with or without the preheating furnace positioned intermediately of it passage, the velocity of transportation of the thermoplastic resin sheet towards the receiving station by means of this conveyor may be either equal to or lower than the peripheral velocity of the press roll being rotated.

In view of the fact that the number of the movable parts to be synchronized to each other is advantageously minimized and that the press roll concurrently serves as a heater for heating the thermoplastic resin sheet during the transportation from the receiving station towards the transfer station and also as a conveyance for transporting the same thermoplastic resin sheet from the receiving the station towards the transfer station, it is clear that the apparatus of the present invention is more compact in size than the apparatus disclosed in the Japanese Patent Publication referred to previously.

These and other objects and features of the present invention will readily become apparent from the following description taken in conjunction with a preferred embodiment thereof with reference to the accompanying drawings, in which.

Figure 1:
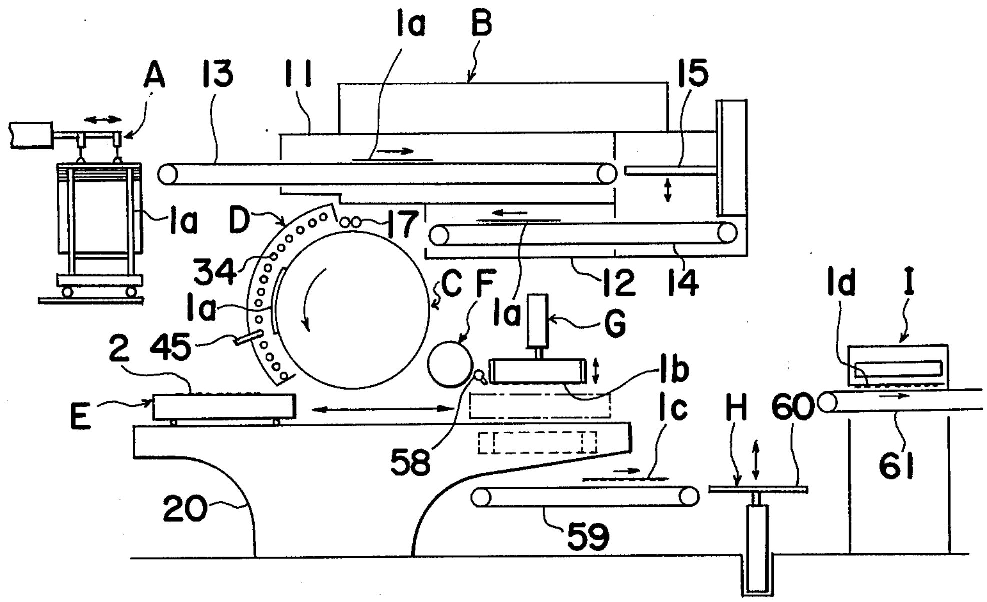
FIG. 1 is a schematic side view of a thermoplastic duplication making apparatus according to the present invention.

Before the description of the present invention proceeds, it is to be noted that like parts are designated by like reference numerals throughout the accompanying drawings. It is also to be noted that the present invention will be described by way of a duplication plate making apparatus capable of producing three duplication plates per minute from thermoplastic resin sheets of polypropylene resin and of a size corresponding to a newspaper of 420 mm. on width and 594 mm. in length.

Referring to the accompanying drawings and, particularly, to FIG. 1, the apparatus of the present invention is shown to comprise, in general, a sheet supply unit A for successively supplying thermoplastic resin sheets one at a time from a stack of thermoplastic resin sheets l*a*; a preheating unit B for preheating the thermoplastic resin sheet l*a* thus supplied by the supply unit A; a rolling unit C including a press roll for receiving the preheated thermoplastic resin sheet at a receiving station and then transporting it towards a transfer station while heating the same thermoplastic resin sheet; a heating unit for heating the thermoplastic resin sheet, being transported by the press roll from the receiving station towards the transfer station, to a predetermined temperature appropriate to perform a transcription process at the transfer station; a movable support unit E including a platen supported for reciprocal movement between stand-by and operated positions in a horizontal direction in synchronism with the rotation of the press roll and having a flat support surface for the support of a paper matrix 2 thereon, which paper matrix has indentations or cavities defining thereon a relief pattern to be transcribed to the thermoplastic resin sheet at the transfer station during passage of said platen from the stand-by position towards the operated position; a squeezing unit F for squeezing the thermoplastic resin sheet which has been transferred onto the paper matrix on the platen; a trimmer unit G for separating the thermoplastic resin sheet, that is, the duplication plate, from the paper matrix on the platen then held at the operated position and for trimming the same thermoplastic resin sheet or duplication plate to remove unnecessary fins present at outer peripheral edges thereof; a conveyance unit H for transporting the trimmed duplication plate towards a subsequent processing station; and a shaping unit I for forming at least one pair of opposed lugs in the duplication plate.

The sheet supply unit A may be of any known construction and, so far illustrated, may be composed of a vertically movable tray, carrying the stack of thermoplastic resin sheets la of equal and predetermined size mounted thereon, and a known suction feeder by which the thermoplastic resin sheets are successively fed one at a time away from the remaining stacked thermoplastic resin sheets while the tray is stepwisely upwardly shifted.

The preheating unit B is comprised of a low temperature furnace 11, including a conveyor 13 operatively extending through said furnace 1, and a high temperature furnace 12 positioned below one end of the conveyor 13 at the leading side with respect to the direction of transportation of the thermoplastic resin sheet *la* and including a conveyor 14 operatively extending through said furnace 12. The leading end of the conveyor 13 and one end of the conveyor 14 adjacent and immediately below the leading end of the conveyor 13 are connected by a fork lift 15 which moves up and down for transferring the thermoplastic resin sheet from the conveyor 13 onto the conveyor 14 and then returning to an upwardly shifted position in readiness for subsequent transportation of the thermoplastic resin sheet.

Preferably, the thermoplastic resin sheet is transported through the furnaces 11 and 12 at a speed of from 2 to 3 meters per minute by the conveyors 13 and 14 and, during this transportation, heated to a temperature where the thermoplastic resin sheet becomes soft. Since substantially uniform heating of the thermoplastic resin sheet is considered important during the preheating, heating by hot air circulation is preferred in the furnaces. Although the temperature of the hot air with which the thermoplastic resin sheet is preheated varies depending upon the type of material for the thermoplastic resin sheet, 120° to 130° C. is considered appropriate in the case where the thermoplastic resin sheet is prepared from polypropylene resin. In addition, the temperature of the hot air is preferred to be controlled within a tolerable range of ±3 ° C. with respect to a predetermined temperature.

The time during which the thermoplastic resin sheet is preheated is preferably within the range of 3 to 4 minutes in view of the fact that it may take about two minutes for the thermoplastic resin sheet of room or ambient temperature to be preheated to the predetermined temperature.

It is to be noted that, although the preheating unit B has been described as comprised of the low and high temperature furnaces 11 and 12, it may not be limited thereto, but may be comprised of a single preheating furnace. However, the employment of the low and high temperature furnaces 11 and 12 for the preheating would not only save a space for installation thereof, but also facilitates an efficient preheating of the thermoplastic resin sheet.

Figure 2:
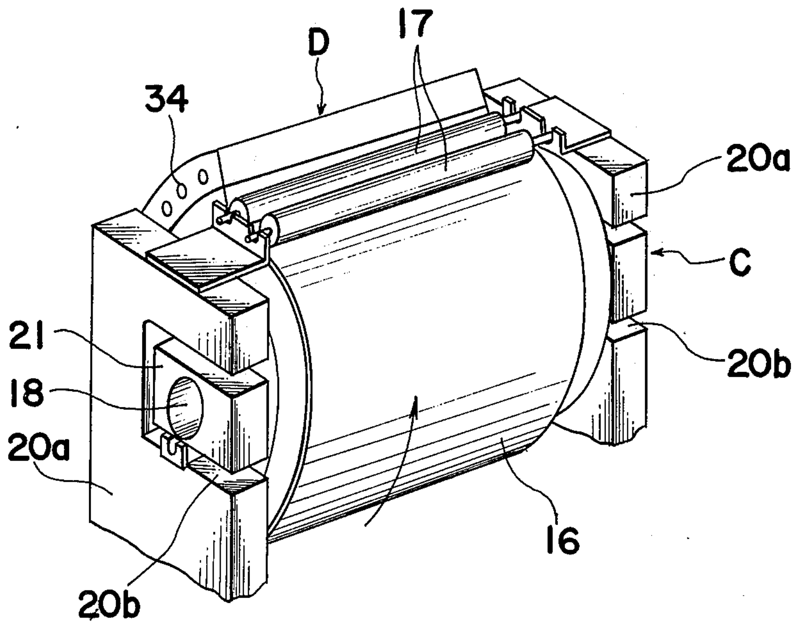
FIG. 2 is a perspective view, on an enlarged scale, of a press roll and its associated support employed in the apparatus of FIG. 1.
Figure 3:
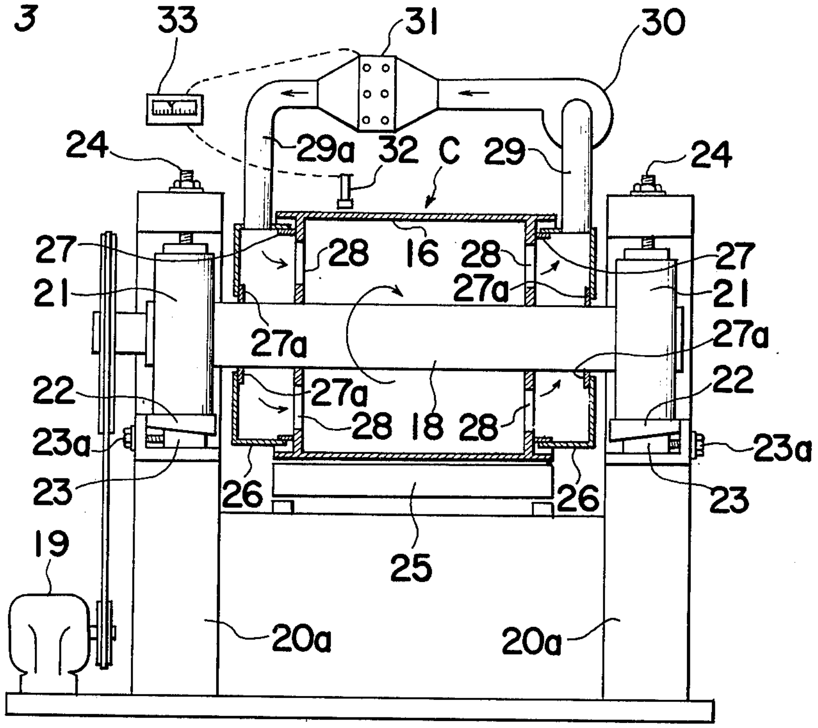
FIG. 3 is a front elevational view, on an enlarged scale and with a portion shown in section, of the apparatus, showing the details of the press roll and its associated support.

The rolling unit C, as best shown in FIGS. 2 and 3, comprises the press roll 16, supported below the preheating unit B for rotation in one direction, as indicated by the arrow in FIGS. 1 and 2, in a manner as will be described later, and a pair of juxtaposed feed rolls 17. Each of the feed rolls 17, although not shown, has a peripheral surface lined with a layer of elastic material, such as synthetic or natural rubber, of a kind having a high resistance to elevated temperature, which is in turn lined on the outer peripheral surface of the elastic layer with a film of fluorine-contained resin. As best shown in FIG. 2, these feed rolls 17 are rotatably supported in position above the press roll 16 so as to apply a downwardly acting pressing force, corresponding in amount to the sum of the weights of these rolls 17, under the influence of gravity force to the thermoplastic resin sheet which has emerged from the preheating unit B and then fed onto a feed gap defined between these rolls 17 and the press roll 16. Since the press roll 16 is heated as will be described in more detail, the preheated thermoplastic resin sheet during its passage through the feed gap is forced by the weight of the rolls 17 to contact the outer peripheral surface of the press roll 16 and then to cling to the outer peripheral surface of said press roll 16 as one of the opposed surfaces of the preheated thermoplastic resin sheet is first plasticized in contact with the outer peripheral surface of the press roll 16 to such an extent that any possible slip will no longer occur between the thermoplastic resin sheet and the outer peripheral surface of the press roll 16. It is to be noted that, during the passage of the preheated thermoplastic resin sheet through the feed gap, each of the feed rolls 17 rotates idle in contact with the thermoplastic resin sheet passing therethrough while the latter enlarges the feed gap against the downwardly acting pressing force applied by said feed rolls 17.

The outer peripheral surface of the press roll 16 is chromium-plated and is in turn mirror-polished. This press roll 16 is mounted on a shaft 18 for rotation together with said shaft 18, which shaft 18 is operatively coupled, as best shown in FIG. 3, to a drive mechanism 19, such as an electrically operated motor, by means of any suitable transmission for rotating the shaft 18 and, therefore, the press roll 16 in one direction as indicated by the arrow in FIGS. 1 and 2. The shaft 18 has the opposed ends journalled, respectively, to bearing blocks 21 supported on a machine bench 20 in such a manner as will now be described with particular reference to FIGS. 2 and 3.

Referring now to FIGS. 2 and 3, the machine bench 20 has a pair of opposed upright side walls **20*a* each having a substantially U-shaped recess 20*b*. The corresponding bearing block 18 is accommodated within the recess 20*b* and mounted on a body portion of the upright side wall 20*a* by means of a wedge piece 22, secured to a lower end of said bearing block 21, and a counteracting wedge pieces 23 adjustably inserted in between the wedge piece 22 and that body portion of the upright side wall 20*a*. On the other hand, each of adjustment screw members 24 one for each upright side wall 20*a* adjustably extends through an overhanging portion of the upright side wall 20*a* and terminates in contact with an upper end of the bearing block 21, thereby securing the bearing block 21 in position within the recess 20*b***.

With this support mechanism, the press roll 16 is so supported that, by moving the counteracting wedge pieces 23 in a direction opposed to each other or in a direction close towards each other by turning respective adjustment screw members **23*a* while the screw members 24 are loosened, the size of a transcription clearance defined between the outer peripheral surface of the press roll 16 and a flat support surface of the platen 25** as will be described later can advantageously be adjusted for making the apparatus of the present invention possible to accommodate different thickness of thermoplastic resin sheets to be handled thereby.

Non-rotatably mounted on the shaft 18 and positioned between each end of the press roll 16 and the upright side wall 20*a* adjacent thereto is a header 26 having a central bore surrounding the shaft 18 and being sealed from the outside by an annular sealing member 27*a*. Each of the headers 26 has an outer periphery integrally formed with an axially extending flange facing the adjacent end of the press roll 16, a sealing member 27 being provided between the free end of the axial flange and the end face of the press roll 16. These headers 26 are in communication with an interior hollow of the press roll 16 through perforations 28 defined in the opposed end walls of the press roll 16.

These headers 26 are in turn communicated to a source of hot air 31, one header 26 being coupled thereto through a piping 29 by way of a blower 30 and the other header 26 being coupled thereto through a piping 29*a*, so that hot air of elevated temperature can be circulated from the hot air source 31 back to said hot air source 31 first flowing into the interior hollow of the press roll 16 through the header 26 by way of the piping 29*a* and then flowing from the interior hollow of the press roll 16 back to the hot air source 31 by way of the piping 29. It is therefore clear that, during circulation of the hot air through the interior hollow of the press roll 16, the press roll and, particularly, the outer peripheral surface of the press roll 16, is heated to a predetermined temperature. The hot air source 31 is to be understood as operatively associated with a temperature adjustment 33 which controls the operation of the hot air source 31 in response to detection of the termperature of the outer peripheral surface of the press roll 16 performed by a temperature sensor 32 disposed adjacent the outer peripheral surface of the press roll 16.

The press roll 16 may have an outer diameter within the range of 400 to 800 mm. and is preferably rotated so as to have the peripheral velocity within the range of 6 to 8 meters per minute. The size of the transcription clearance defined between the outer peripheral surface of the press roll 16 and the flat support surface of the platen 25 for the support of a paper matrix 2 thereon is selected depending upon the sum of the thickness of the paper matrix 2 and the thickness of the thermoplastic resin sheet 1*b* and is preferably not more that 2 mm.

In order that the preheated thermoplastic resin sheet can uniformly contacts and, then, clings to the outer peripheral surface of the press roll as it passes through the feed gap defined between the feed rolls 17 and the press roll 16, the temperature of the outer peripheral surface of the press roll 16 is adjusted to a value slightly lower than the melting point of the thermoplastic resin sheet 1*a* and, for example, in the case of the thermoplastic resin sheet 1*a* being prepared from polypropylene resin, within the range of 130° to 170° C. This can readily be achieved by adjusting the temperature of the hot air from the hot air source 31 by adequately setting the temperature adjustment 33.

Referring to FIGS. 1 and 2, the heating unit D substantially extends from the receiving station, where the fed gap is located, to a position preceding the transfer station, where the transcription clearance is located, on the leading side with respect to the direction of rotation of the press roll 16, following the curvature of the pressroll 16. This heating unit D comprises a plurality of juxtaposed far infrared heaters 34 extending parallel to and equally spaced from the outer peripheral surface of the pressroll 16, following the curvature of the pressroll 16. This heating unit D comprises a plurality of juxtaposed far infrared heaters 34 extending parallel to and equally spaced from the outer peripheral surface of the pressroll 16. This heating unit D is capable of heating the thermoplastic resin sheet 1*a* clinging to the outer peripheral surface of the pressroll 16 to a temperature substantially equal to the melting point of the thermoplastic resin sheet, for example, within the range of 160° to 190° C. in the case of the thermoplastic resin sheet being prepared from polypropylene resin.

Figure 4:
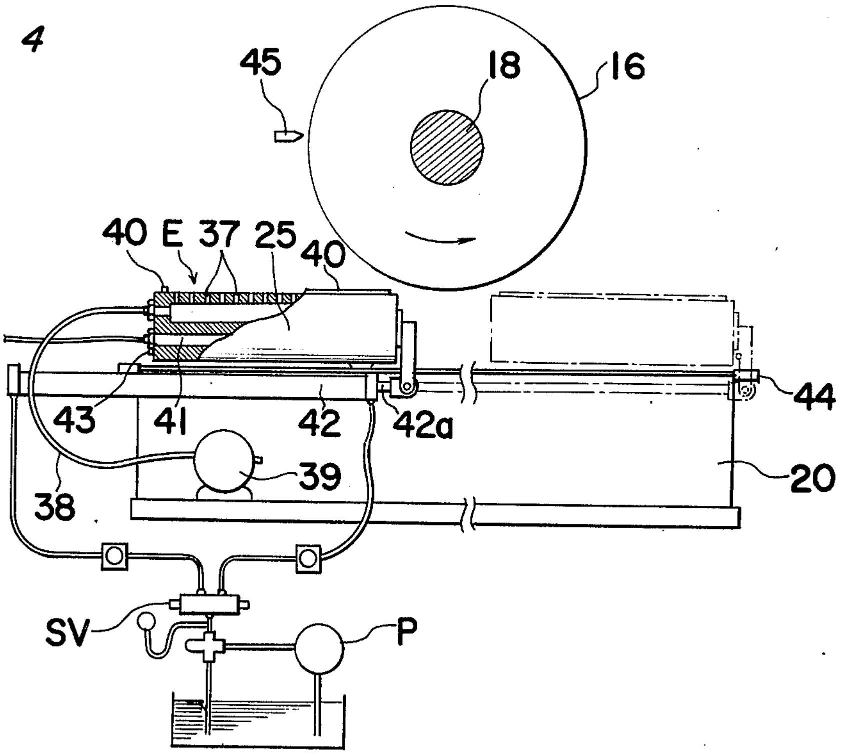
FIG. 4 is a side view, with a portion broken away and on an enlarged scale, of a platen and its associated parts employed in the apparatus of FIG. 1.
Figure 5:
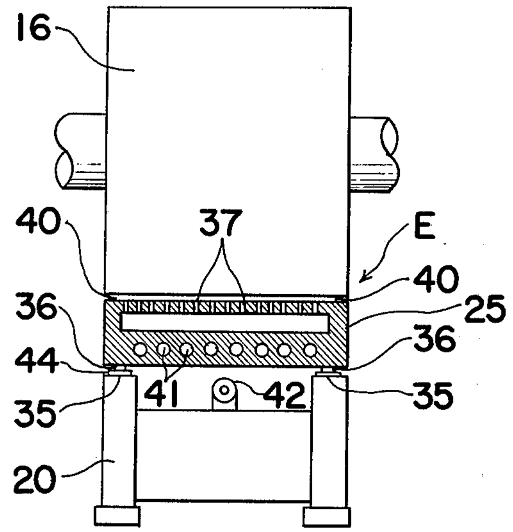
FIG. 5 is a rear elevational view of FIG. 4, with the platen shown in section.

As shown in FIGS. 4 and 5, the platen 25, constituting the movable support unit E, has at least two pairs of wheels 36 through which said platen 25 is mounted on a pair of guide rails 35, rigidly mounted on the machine bench 20, for linear movement between the stand-by position and the operated position. The flatsupport surface of the platen 25 is formed with a plurality of perforations 37 which are in communication with a source of vacuum 39 by means of a flexible tubing 38. The vacuum source 39 is, in the instance as shown, composed of a blower for drawing air through the perforations 37 in the flat support surface of the platen 25 and for subsequently discharging the air thus drawn through said blower. The vacuum source 39 is employed for the purpose of supporting the paper matrix 2 firmly on the flat support surface of the platen 25 by the effect of a suction force developed by the vacuum source 39. For facilitating positioning of the paper matrix 2 on the perforated flat support surface of the platen 25 prior to the suction force being developed, positioning bears or rulers 40 are mounted on the flat support surface of the platen 25 adjacent peripheral edges thereof.

The platen 25 has a water jacket 41 defined therein for passage of a cooling water therethrough, which cooling water flowing through the water jacket 41 cools the platen 25 and then the paper matrix 2 supported on the flat support surface of the platen 25. Because of the water-cooled construction in the platen 25, excessive sticking of the thermoplastic resin sheet to the paper matrix 2 which may otherwise occur at the transfer station when the thermoplastic resin sheet in a substantially semi-fluidized state is forced against the paper matrix in a manner as will be described later can advantageously be avoided and, in addition, ready cooling of the thermoplastic resin sheet, which has been transferred onto the paper matrix 2 on the platen 25, can be facilitated.

The reciprocal linear movement of the platen 25 is effected by a hydraulic cylinder 42. The hydraulic cylinder 42 is of a construction having left-hand and right-hand chambers partitioned from each other in a cylinder casing by a plunger (not shown) secured to one end of a piston rod 42*a*, the other end of said piston rod 42*a* being operatively coupled to the platen 25. In the construction so far described, the platen 25 is moved from the stand-by position towards the operated position when a fluid medium is supplied into the left-hand chamber of the cylinder casing of the cylinder 42 with the piston rod 42*a* projected outwardly while the platen 25 in the operated position can be returned to the stand-by position when a fluid medium is supplied into the right-hand chamber of the cylinder casing of the cylinder 42 with the piston rod 42*a* retracted inwardly of the cylinder casing.

It is to be noted that, since the paper matrix 2 mounted on the flat support surface of the platen 25 must be registered or aligned with the thermoplastic resin sheet l*a*, which is transported by the press roll 16 from the receiving station towards the transfer station while it clings to the outer peripheral surface of the press roll 16 in the manner as hereinbefore described, at the transfer station, the velocity of movement of the platen 25 from the stand-by position towards the operated position is synchronized with the peripheray velocity of the press roll 16. The velocity of movement of the platen 25 from the operated position back towards the stand-by position may preferably be higher than that from the stand-by position towards the operated position.

For the purpose of synchrinization, a fluid circuit includes a solenoid-operated switching valve SV operatively associated with first and second limit switches 43 and 44 in such a manner that, only when the platen 25 is returned to the stand-by position as shown, the first limit switch 43 generates an electric signal to the switching valve SV to cause the latter to complete a fluid circuit between the left-hand chamber of the cylinder 42 and a fluid reservoir tank through an electrically operated pump P while, only when the platen 25 is moved to the operated position as indicated by the chain line in FIG. 4; the second limit switch 44 generates an electrical signal to the switching valve SV to cause the latter to complete a fluid circuit between the right-hand chamber of the cylinder 42 and the fluid reservior tank through the pump P. Assuming that the platen 25 is positioned at the stand-by position as shown and, therefore, the switching valve SV is in position to complete the fluid circuit between the left-hand chamber of the cylinder 42, the pump P starts its operation so as to supply fluid medium under pressure from the reservoir tank to the left-hand chamber of the cylinder 42 upon receipt of an electric signal which is generated by a photo-detecting cell 45 in response to the passage of the leading end of the thermoplastic resin sheet l*a*, carried by the press roll 16 being rotated, in front of said photo-detecting cell 45. In this way, the platen 25 is moved from the stand-by position towards the operated position with the piston rod 42*a* outwardly projected from the cylinder 42.

On the other hand, when the platen 25 arrives at the operated position, the second limit switch 44 generates an enectric signal to the switching valve SV to cause the latter to complete the fluid circuit between the right-hand chamber of the cylinder 42 and the reservoir tank through the pump P still operated. Therefore, the platen 25 in the operated position can be returned back to the stand-by position with the piston rod 42*a* inwardly retracted into the cylinder 42. Upon return of the platen 25 to the stand-by position as shown, the first limit switch 43 generates the electrical signal with which the punm P is deenergized on one hand and the switching valve SV is brought into a position to complete the fluid circuit between the reservoir tank and the left-hand chamber of the cylinder 42 in readiness for subsequent cycle of movement of the platen 25.

It is to be noted that, although not shown, an electrical circuit between the limit switch 44 and the switching valve SV is to be understood as including a delay circuit for holding the platen 25 at the operated position for a predetermined period of time for the purpose as will be described later.

The transcription process during which the thermoplastic resin sheet, which has become substantially semifluizided, is forced to penetrate into the indentation or cavity in the paper matrix 2 takes place as the thermoplastic resin sheet, carried by the press roll 16 being rotated towards the transfer station, and the paper matrix 2, carried by the platen 25 being moved from the stand-by position towards the operated position, pass simultaneously through the transcription clearance defined between the outer peripheral surface of the press roll 16 and the plane of the flat support surface of the platen 25.

Subsequent to the transcription process, since the paper matrix 2 is cooled in contact with the water-cooled platen 25, the thermoplastic resin sheet so pressed against the paper matrix 2 during the passage thereof through the transcription clearance tends to stretch as it is cooled in contact with the paper matrix 2 and, therefore, the thermoplastic resin sheet is transferred onto the paper matrix 2 on the platen 25 being moved towards the operated position, thereby separating from the outer peripheral surface of the press roll 16. Accordingly, from the moment the trailing end of the platen 25 with respect to the direction of movement thereof towards the operated position had emerged the transcription clearance during the continued movement of said platen 25 towards the operated position and until the platen 25 arrives at the operated position, the thermoplastic resin sheet is transported as mounted on the paper matrix 2 which is in turn mounted on the flat support surface of the platen 25 by the effect of the suction force.

The squeezing unit F, positioned above the machine bench 20 and substantially intermediate between the transcription clearance and the operated position of the platen 25, comprises a hollow cylindrical squeezing roll 46 having an outer peripheral surface mirror-polished in a similar manner as the press roll 16 and spaced from the plane of the flat support surface of the platen 25 to define a squeezing clearance between it and said plane of said flat support surface of the platen 25. This squeezing roll 46 has shaft portions outwardly extending from the respective ends of said squeezing roll 46 in alignment with the longitudinal axis thereof, which shaft portions are rotatably journalled to bearing blocks 47. These bearing blocks 47 are so supported on the machine bench 20 in a similar manner as the bearing blocks 21 that the size or width of the squeezing clearance between the outer peripheral surface of the squeezing roll 46 and the plane of the flat support surface of the platen 25 can be adjustable by following a similar adjustment procedure for the adjustment of the size or width of the transcription clearance.

The squeezing roll 46 may be operatively coupled to any suitable drive mechanism for rotating said roll 46. However, in the instance as shown, the squeezing roll 46 is shown to be freely rotatable about the shaft portions one at each end of the roll 46. Even though the roll 46 is not operatively coupled to the drive mechanism, it sufficiently serves the purpose in view of the fact that, as the thermoplastic resin sheet transferred onto the paper matrix moves through the squeezing clearance together with the platen 25 being moved towards the operated position, the roll 46 rotates in contact with the thermoplastic resin sheet being moved thereby, consequently applying a pressing force to said thermoplastic resin sheet. Preferably, the squeezing roll 46 have an outer diameter of about 300 mm.

Figure 6:
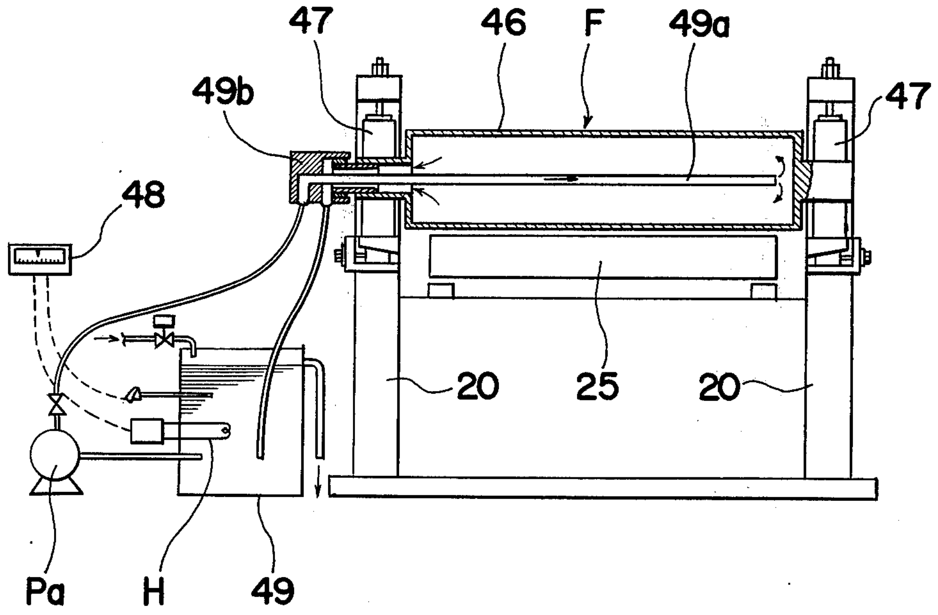
FIG. 6 is a front elevational view of a portion of the apparatus, showing a finishing roll and its associated supports and fluid circuit on an enlarged scale.

As shown in FIG. 6, the squeezing roll 46 is of water-cooled construction and, for this purpose, one of the shaft portions of the roll 46 is formed with a passage through which a supply pipe 49*a* extends. The supply pipe 49*a* has one end coupled to a distributor 49*b* which is in turn coupled to a source of cooling medium 49, for example, cooling water, through a supply pump P*a*. The interior hollow of the squeezing roll 46 is in communication with the cooling medium source 49 through the distributor 49*b* by way of an annular clearance between the outer periphery of the supply pipe 49*a* and the passage in the shaft portion at one end of the squeezing roll 46. In the construction so far described, as indicated by the arrow, the cooling medium flows from the supply pipe 49*a* into the interior hollow of the squeezing roll 46 and then from the interior hollow of said roll 46 back to the cooling medium source 49. For maintaining the temperature of the squeezing roll 46 at a predetermined value throughout the operation of thermoplastic duplication plate making with the apparatus of the present invention, a temperature adjustment 48 including a temperature sensor for sensing the temperature of the cooling medium in the cooling medium source 49 and a heater H for heating the cooling medium in the cooling medium source 49 only when the sensed temperature of the cooling medium falls below a predetermined value is employed.

Since the thermoplastic resin sheet transferred onto the matrix can readily be cooled if the temperature of the squeezing roll 46 is low, the squeezing roll 46 is preferably cooled to a temperature within the range of 5° to 80° C. and lower than that of the thermoplastic resin sheet.

The employment of the squeezing unit F of the construction as hereinbefore described is advantageous in that, since the thermoplastic resin sheet, which has been pressed against and then transferred onto the paper matrix 2 carried by the platen 25 being moved towards the operated position, is again rolled flat against the paper matrix 2 during the passage through the squeezing clearance, the details of the relief pattern on the paper matrix 2 can be transcribed to the thermoplastic resin sheet.

Figure 7:
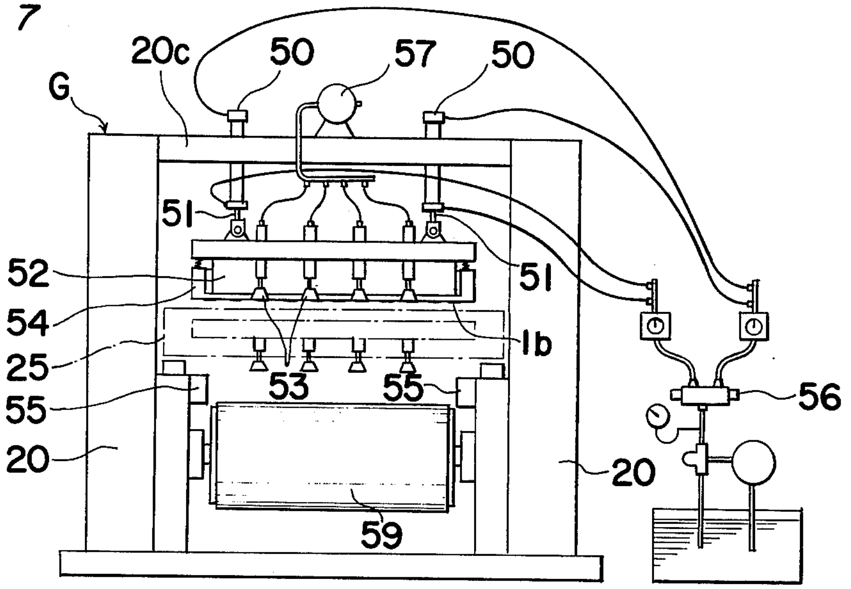
FIG. 7 is a front elevational view of a trimming unit employed in the apparatus of FIG. 1.
Figure 9:
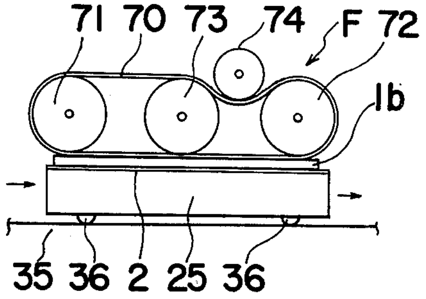
FIG. 9 is a side view, showing a modification of the finishing roll, which may be employed in the apparatus of the present invention.

The trimmer unit G for separating the thermoplastic resin sheet from the paper matrix on the platen 25 and then trimming outer peripheral edges of the separated thermoplastic resin sheet is positioned at the operated position of the platen 25. As best shown in FIG. 7, the trimmer unit G comprises a cutter 52 supported immediately above the platen 25 in the operated position for movement between elevated and lowered positions in a direction perpendicular to the plane of the flat support surface of the platen 25. For this purpose, hydraulic cylinders 50 each having a piston rod 51, pivotally connected at its free end to the cutter 52, and hydraulically coupled to a source of hydraulic pressure 56 are carried by a beam member 20*c* straddling the machine bench 20 and situated above the cutter 52. The cutter 52 has a plurality of vacuum suckers 53 of a pneumatic cylinder type carried by the cutter 52 for movement between projected and retracted positions, which suckers 53 are pneumatically coupled to a source of vacuum 57. This cutter 52 further has a presser plate 54 fitted thereto for movement up and down in a direction perpendicular to the plane of the flat support surface of the platen 25.

Cooperative with the cutter 52 is a counteracting cutter 55 provided in the machine bench 20, which cutter 52 cooperates with said counteracting cutter 55 to trim the peripheral edges of the thermoplastic resin sheet when the cutter 52 is moved from the elevated position towards the lowered position as will be described later.

For facilitating separation of the thermoplastic resin sheet from the paper matrix firmly sucked onto the flat support surface of the platen 25 in the operated position, a cooling air applicator 58 may be positioned, as shown in FIG. 1, between the squeezing unit F and the trimmer unit F so that a cooling air can be applied therefrom towards the thermoplastic resin sheet on the paper matrix on the platen 25 in the operated position to cool said thermoplastic resin sheet.

In operation, when the platen 25 carrying the thermoplastic resin sheet through the paper matrix 2 arrives at the operated position and the electrical signal indicative of the arrival of the platen 25 to the operated position is, therefore, generated by the limit switch 44, the signal is applied in part to the switching valve SV through the delay circuit (not shown) as hereinbefore described and in part to the vacuum source 57 to operate the latter.

During the predetermined period of time set to the delay circuit, and since the vacuum source 57 is actuated in response to the arrival of the platen 25 to the operated position, the vacuum suckers 53 are moved towards the projected position to suck the thermoplastic resin sheet 1b mounted on the platen 25 through the paper matrix 2. Thereafter, the suckers 53 while sucking the thermoplastic resin sheet 1b are returned back to the retracted position, thereby separating the thermoplastic resin sheet from the paper matrix 2 which is still firmly sucked onto the flat support surface of the platen 25 in the operated position. Upon return of the suckers 53 back to the retracted position, the predetermined period of time set to the delay circuit expires and, therefore, the platen 25 starts its return movement from the operated position back towards the stand-by positions together with the paper matrix 2 at a predetermined velocity.

Subsequently, by the operation of the cylinders 50, the cutter 52 is moved from the elevated position towards the lowered position while the thermoplastic resin sheet 1*b* is supported by the vacuum suckers 53. During the movement of the cutter 52 towards the lowered position the cutter 52 cooperates with the counteracting cutter 55 to thereby trim the peripheral edges of the thermoplastic resin sheet 1*b* supported by the suckers 53. Thereafter, the cutter 52 is returned back to the elevated position while the thermoplastic resin sheet is separated from the suckers 53, thereby providing a thermoplastic duplication plate 1*c* ready for actual use as a printing plate.

The thermoplastic resin sheet 1*c*, that is, the duplication plate, which has been separated from the suckers 53 falls by gravity onto a substantially endless belt 59 which extends from a position below the cutter 55 to a position adjacent a lifter 60, as shown in FIG. 1. The thermoplastic duplication plate 1*c* so transported by the belt 59 onto the lifter 60 is upwardly lifted and is then received by the shaping unit I which will now be described with particular reference to FIG. 8.

The shaping unit I serves to form a pair of opposed lugs by bending a pair of opposed marginal ends of the duplication plate 1*c* in a direction opposed to the surface thereof where the relief image has beem formed, through which lugs the duplication plate can be fitted to a printing cylinder of a high speed rotary press. This shaping unit I may be designed such that, while the thermoplastic duplication plate 1c is transported by a substantally endless conveyance belt 61, the lugs are formed continuously by roller means (not shown). Alternatively, the shaping unit I may includes such means as shown in FIG. 8.

Figure 8:
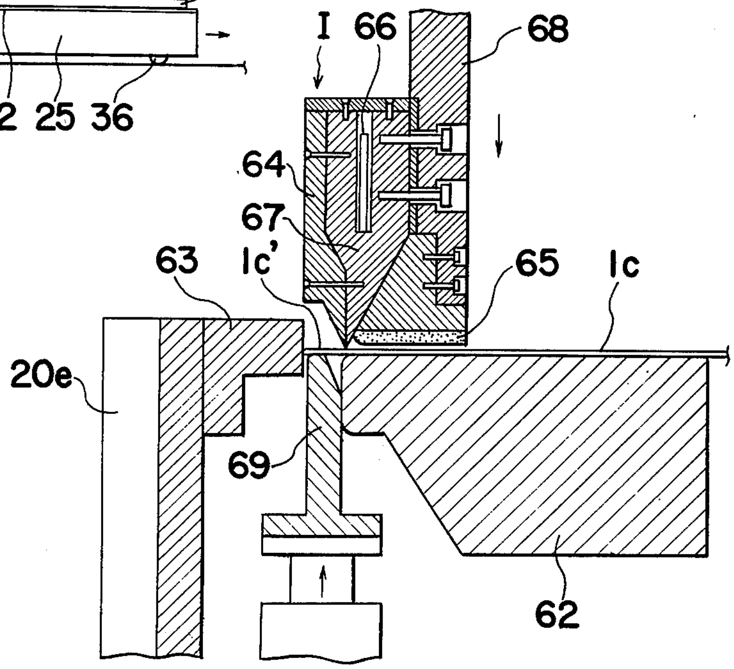
FIG. 8 is a sectional view, on an enlarged scale, of a shaping unit employed in the apparatus of FIG. 1, showing the details of one of the opposite lugs being formed in a duplication plate.

In the instance as shown in FIG. 8, the duplication plate 1c is placed on a table 62 with one edge thereof abutted against a positioning bar 63 secured to a support structure 20e. A portion 1c'adjacent said edge of the duplication plate 1c on the table 62 projects outwardly beyond the table 62 and is pressed by a presser structure. The presser structure includes a presser 67 having a tapering portion, held in contact with the surface of the duplication plate 1c opposed to the surface thereof where the relief image has been formed, and a heating element 66, which presser 67 has one side surface secured to a member 68 and the other side surface lined with a lining 64 of heat insulating material. The presser structure further includes a rubber layer secured at 65 for preventing the duplication plate 1c, thus retained in position by the presser structure, from being scratched or otherwise damaged.

Cooperative with the presser structure is a punch 69 supported in position for movement between elevated and lowered positions in a direction as indicated by the arrow and in a direction perpendicular to the plane of the duplication plate 1c on the table 62, which punch 69 when moved towards the elevated position projects in between the positioning bar 63 and the table 62, thereby bending that portion 1c'of the duplication plate 1c, which that portion 1c'so bent serves as a lug through which the duplication plate can be fitted to the printing cylinder of the high speed rotary press. In this way, the opposed lugs can be formed in the duplication plate.

As a material for the thermoplastic resin sheet and, hence, the thermoplastic duplication plate manufactured by the apparatus of the present invention, any thermoplastic resin may be employed if it has a relatively high softening point and a sufficient resistance to such an oil as contained in an ordinary printing ink and be inexpensive and capable of being recycled. However, any one of polyethylene resin and polypropylene resin is preferred as a material for the ultimate duplication plate. More preferred is the polypropylene resin because of its physical strength sufficient to withstand severe conditions which the ultimate thermoplastic duplication plate may receive when used as a printing plate in a rotary press for printing a large number of copies of newspaper from a single printing plate.

More specifically, in view of the fact that any of the polyethylene resin and the polypropylene resin has numerous types which exhibit different fluidity, when heated to fuse, due to difference in degree of polymerization and/or molecular weight, one or more polyethylene or polypropylene resins which exhibit a melt flow rate within the range of from 3 to 10 at such a temperature as attained during the transcription process may preferably and advantageously be employed as a material for the ultimate thermoplastic duplication plate in consideration of availability of reliable reproduction of print details and also of "recycleability," that is, capability of being recycled for the subsequent production material.

The size and the thickness of the thermoplastic resin sheet to be treated may be selected depending upon the purpose for which the ultimate duplication plate is used and/or the type of paper matrix used therewith. However, where the paper matrix used tends to exhibit reduction in workability upon repeated application of loads thereto from the press roll 16 through the thermoplastic resin sheet during the passage thereof through the transcription clearance, the thermoplastic resin sheet to be treated may have a thickness, varying in a predetermined gradient, over the entire length thereof. The employment of the thermoplastic resin sheet of varying thickness described above provides such an additional advantage that the duplication plate having a more uniform thickness over the entire length thereof can be available. A similar advantage can also be appreciated even if a plurality of holes or recesses are formed in the thermoplastic resin sheet to be treated.

Although the present invention has fully been described in conjunction with the preferred embodiments thereof, it is to be noted that various changes and modifications are apparent to those skilled in the art. By way of example, a parting agent, such as oil or silicone, may be applied to one or both of the outer peripheral surface of the press roll 16 and the surface of the paper matrix 2 to which the thermoplastic resin sheet is applied. In addition, although the matrix 2 has been described as made of paper material, it may be made of plastic material or metallic material.

Moreover, as shown in FIG. 8, the squeezing unit F may be constituted by a substantially endless belt 70 trained or fitted around a plurality of rolls 71, 72 and 73, it being to be understood that the intermediate roll 73 may not be always necessary. The squeezing unit F may further include a tensioning roll 74 for holding the belt under tension. It is to be noted that at least one of the rolls 71 and 72 may be coupled to a suitable drive mechanism.

Furthermore, for effecting the movement of the platen 25 and that of the cutter 52, an electric drive system may be employed in place of the hydraulic drive system.

Therefore, these changes and modifications are to be understood as included within the true scope of the present invention unless they depart therefrom.

We claim:

1. An apparatus for manufacturing a thermoplastic duplication plate having a relief image formed at one surface thereof, which comprises:

a hollow cylinder supported in position for rotation in one direction, said hollow cylinder during each complete rotation thereof moving past a receiving station and then a transfer station angularly spaced from said receiving station and situated on the leading side with respect to the direction of rotation of said hollow cylinder;

means for successively supplying thermoplastic resin sheets onto said hollow cylinder one at a time at said receiving station, the thermoplastic resin sheet so supplied onto said hollow cylinder at said receiving station being subsequently transported towards the transfer station while it clings to an outer peripheral surface of said hollow cylinder;

means positioned externally of said hollow cylinder for heating the thermoplastic resin sheet being transported by said hollow cylinder from said receiving station towards said transfer station to a point where said thermoplastic resin sheet become substantially semi-fluidized;

carriage means supported in position for linear movement between stand-by and operated position in a direction transversely of the imaginary plane passing through the longitudinal axis of said hollow cylinder and having a flat support surface for the support of a matrix thereon, said matrix having a relief pattern in complemental in shape to the relief image to be transcribed to the thermoplastic resin sheet, said carriage means during movement from said stand-by position towards said operated position being synchronized with said hollow cylinder such that the thermoplastic resin sheet being transported by said hollow cylinder is registered at said transfer station with the matrix fixedly mounted on said flat support surface of said carriage means;

said thermoplastic resin sheet during passage thereof through a transcription clearance defined between the outer peripheral surface of said hollow cylinder and said flat support surface of said carriage being then underneath said hollow cylinder, being penetrated into and transferred onto said matrix during the continued movement of said carriage means towards said operation position; and means for separating the thermoplastic resin sheet, which has been transferred onto said matrix, from said matrix when said carriage means is held in said operated position.

2. An apparatus as claimed in claim 1, further comprising means for supplying a medium into the hollow of said hollow cylinder to maintain the temperature of the outer peripheral surface of said hollow cylinder to a predetermined temperature.

3. An apparatus as claimed in claim 1, further comprising a preheating compartment positioned between said receiving station and said supplying means, and means for transporting the thermoplastic resin sheets one at a time through said preheating compartment.

4. An apparatus as claimed in claim 3, wherein said preheating compartment is composed of a low temperature section and a high temperature section, said thermoplastic resin sheet prior to being mounted on said hollow cylinder being first passed through said low temperature section and then through said high temperature section.

5. An apparatus as claimed in claim 1, further comprising at least one feed roll rotatably supported at said receiving station above said hollow cylinder for forcibly contacting the thermoplastic resin sheet to the outer peripheral surface of said cylinder.

6. An apparatus as claimed in claim 1, wherein said carriage means comprises a platen having an interior chamber and wherein said flat support surface is defined in one surface of said platen and has a plurality of perforations in communication with said interior chamber of said platen, said interior chamber of said platen being communicated to a source of vacuum such that said matrix is supported on said flat support surface by the effect of a suction force developed in said interior chamber of said platen.

7. An apparatus as claimed in claim 1, further comprising means including a photodetector for synchronizing the movement of said carriage means with the rotation of said cylinder such that said thermoplastic resin sheet, carried by said cylinder and transported towards said transfer station, can be registered at said transfer station with said matrix carried by said carriage means being moved towards the operated position.

8. An apparatus as claimed in claim 1, further comprising a pressing unit disposed on a path of movement of said carriage means between said transfer station and said operated position for pressing the thermoplastic resin sheet, which has been transferred onto said matrix on said carriage means.

9. An apparatus as claimed in claim 8, wherein said pressing unit comprises at least one cylindrical roll.

10. An apparatus as claimed in claim 8, wherein said pressing unit comprises a substantially endless belt.

11. An apparatus as claimed in claim 1, further comprising means for trimming peripheral edges of the thermoplastic resin sheet mounted on said carriage means then positioned in said operated position.

12. An apparatus as claimed in claim 11, further comprising means for forming a pair of opposed lugs at the opposed end portions of said thermoplastic resin sheet which has been trimmed.

13. An apparatus as claimed in claim 1, wherein said carriage means is moved by a hydraulic cylinder having a piston rod coupled to said carriage.

* * * * *